United States Patent

[11] 3,603,940

| | | | |
|---|---|---|---|
| [72] | Inventor | Max M. Adams<br>Cincinnati, Ohio | |
| [21] | Appl. No. | 853,643 | |
| [22] | Filed | Aug. 28, 1969 | |
| [45] | Patented | Sept. 7, 1971 | |
| [73] | Assignee | General Electric Company | |

[54] PULSE STORAGE AND COUNT-OUT DEVICE
10 Claims, 1 Drawing Fig.

[52] U.S. Cl. .................................................. 340/174 QP,
340/174 R
[51] Int. Cl. ................................................... G11c 11/06,
G11c 7/00
[50] Field of Search .......................................... 340/174;
307/88

[56] References Cited
UNITED STATES PATENTS

| | | | |
|---|---|---|---|
| 3,108,194 | 10/1963 | Weller, Jr. ..................... | 307/88 |
| 3,355,594 | 11/1967 | Pinckaers ..................... | 307/88 |
| 3,376,410 | 4/1968 | Lundin ......................... | 307/88 X |

*Primary Examiner*—Stanley M. Urynowicz, Jr.
*Attorneys*—Derek P. Lawrence, Thomas J. Bird, Jr. and Lee H. Sachs ABSTRACT: Apparatus for storing and/or counting out a series of magnetic pulses. Circuitry is shown for generating a rectangular pulse to correspond to the sensing of an event. This rectangular pulse applies a predetermined number of volt-seconds to a winding associated with a single magnetic storage core. A count-out circuit includes both means for determining the number of pulses stored and means for determining when the core is saturated. Provision is made to utilize the same circuitry to count-in as to count-out.

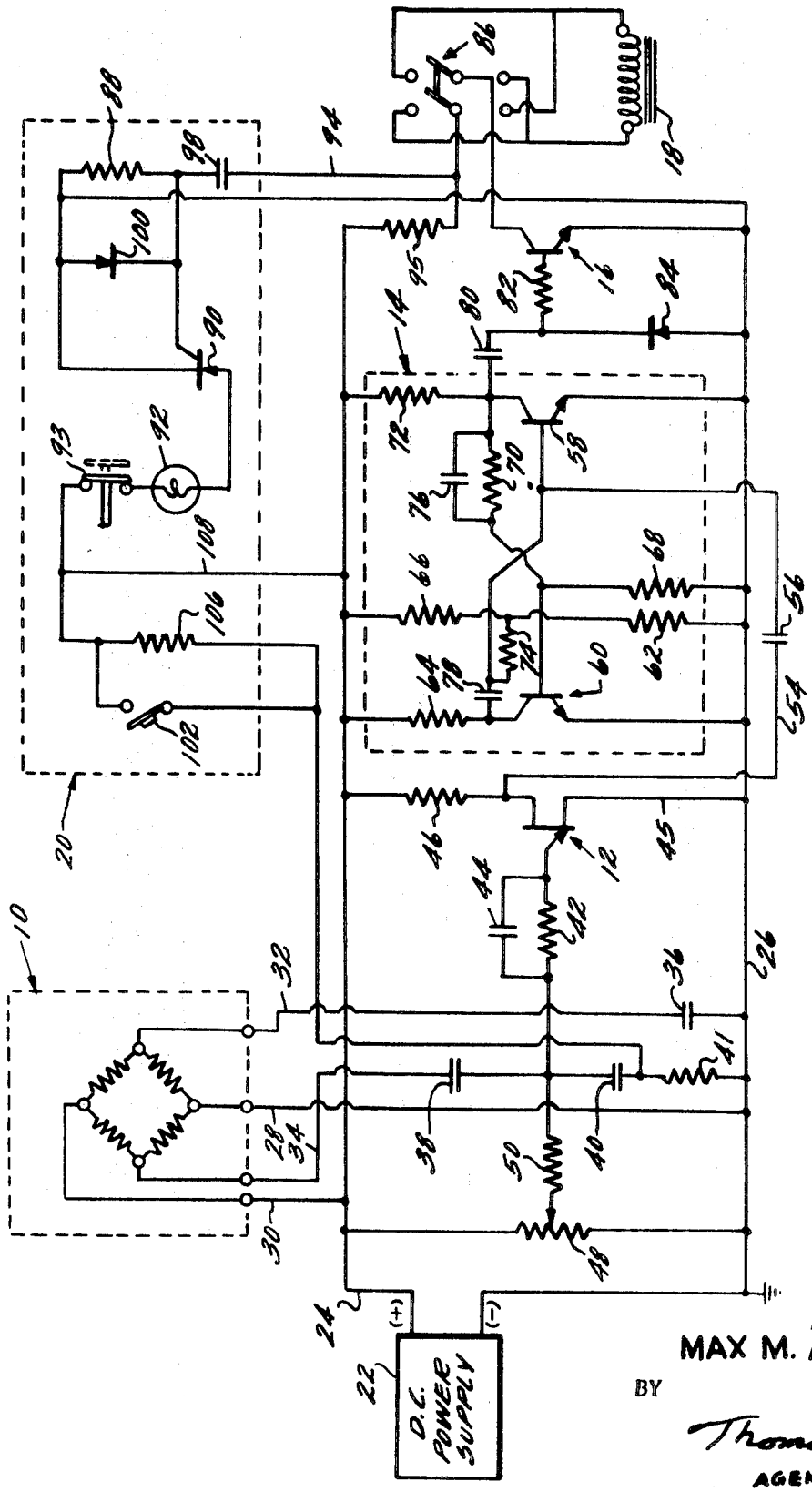

PULSE STORAGE AND COUNT-OUT DEVICE

BACKGROUND OF THE INVENTION

This invention relates generally to magnetic pulse storage devices, and more particularly, to such devices which utilize a one-shot multivibrator as a pulse forming element. This invention further relates to magnetic storage devices which utilize a single core and winding but which are capable of being stepped in a plurality of discrete stable steps.

Magnetic storage devices generally utilize the two retentivity points of a magnetic core as the two stable stages of said core, namely, one having a positive remanent state and the other having a negative remanent state. It is generally known that when a series of pulses each of a magnetomotive force (M.M.F.) greater than the coercive force of a magnetic core but of an insufficient time duration to completely switch the core are applied to a magnetic core which exhibits a rectangular hysteresis loop, and which is at a boundary retentivity point of said hysteresis loop, the magnetic induction increases in steps through a plurality of intermediate remanence points until the other boundary retentivity point is reached. The number of steps required to change the magnetic induction of the core from one boundary point to the other is dependent on the magnitude of the applied M.M.F. pulses. When using the magnetic core as a counting device, therefore, it is desirable that the magnitude of the applied M.M.F. pulses be closely controlled.

Many systems have therefore been developed for controlling the magnitude of the applied pulses. In the prior art, the majority of such developed systems are multicore and multiwinding types. For example, systems have been developed which utilize a "quantizing core" in addition to a multistable storage core. The quantizing core is designed so that it is switched completely from one retentivity point to saturation in the opposite direction for each signal pulse applied to it. Such a core presents a fixed change of flux linkage and hence an output pulse to the storage core having a fixed volt-second interval for each signal pulse that switches the quantizing core.

Other systems have been developed which utilize a standardizing stage which is responsive to the pulses to be counted to provide a series of standardized or constant energy pulses for the magnetic storage core. Such standardizing stages generally include additional magnetic cores and additional windings with a necessity for accurate and exact turn ratios between the input windings and the output windings.

The primary advantage of the magnetic core as a storage or accumulating element resides in its relatively small size and its ability to count more than two pulses before providing a single output pulse. This advantage is, of course, lost to a certain extent when additional cores are needed to regulate the input pulses to the storage core. It is especially desirable to reduce the number of cores and their associated components when performing logic or arithmetic functions with the storage cores.

SUMMARY OF THE INVENTION

It is one object of this invention, therefore, to provide a multiple pulse storage device which utilizes a single magnetic core and a single winding and thereby eliminates exact turn ratio requirements of currently used magnetic storage devices.

It is a further object of this invention to provide a pulse storage device which utilizes the same storage core and pulse generator for both "count-in" and "count-out" functions.

An additional object of this invention is to provide a pulse storage device which utilizes a one-shot multivibrator as a pulse forming element.

Briefly stated, the objects of this invention are carried out, in one form thereof, by providing a pulse storage device which includes an activated sensor, whose output is connected to the base of a unijunction transistor (UJT) which fires when the input potential on its base exceeds a certain value. The firing level of sensor (not UJT is biases by a potentiometer which sets a DC level on the input of the UJT which is just below the level required to fire it. A negative pulse generated by the UJT is connected to a one-shot multivibrator which produces a positive rectangular pulse of constant amplitude and duration for each negative pulse imposed upon the input of the multivibrator. The rectangular pulses are next impressed on the base of a power amplifying transistor which applies a predetermined number of volt-seconds to a winding associated with a magnetic storage core which has been previously saturated in one direction. The pulses drive the storage core toward saturation in the opposite direction in equal steps. The magnetic storage core is electrically connected to a "count-out" circuit which includes means for determining the number of pulses carried by the magnetic storage core and means for determining when the core has reached a certain level.

DESCRIPTION OF THE DRAWING

While the specification concludes with claims particularly pointing out and distinctly claiming the subject matter of the invention which is sought to be protected, an understanding of the invention may be gained from the following detailed description of a preferred embodiment in connection with the accompanying drawing, which is a circuit schematic of a pulse storage and count-out device constructed in accordance with the principles of this invention.

Referring to the sole drawing, a pulse storage and count-out device constructed in accordance with this invention includes the following basic items: a bridge circuit 10 of a conventional sensor (not detailed), a voltage level detector which may take the form of a unijunction transistor 12 whose emitter is connected to the output of the bridge circuit 10, a transistor one-shot multivibrator 14 whose input is connected to the output of the unijunction transistor 12, a power amplifying transistor 16 whose input is connected to the output of the one-shot multivibrator 14, a magnetic storage device 18 (consisting of a single core and its associated winding), a count-out circuit 20, and a DC power supply 22.

The overall circuit is energized by the DC power supply 22 which has a positive terminal connected to a lead 24 and a negative or ground terminal connected to a lead 26. The bridge circuit 10 is energized by means of a pair of input lead lines 28 and 30 connected to the lines 26, and 24, respectively. One output lead 32 of the bridge circuit 10 is connected to the ground lead 26 through an isolating capacitor 36, and a second output lead 34 is connected to the ground lead 26 through series-connected capacitors 38 and 40 and through a resistor 41. The emitter of the unijunction transistor 12 is connected to the output lead 34 at the junction of the capacitors 38 and 40 through a time lag circuit comprising parallel connected resistor 42 and capacitor 44. One base of the unijunction transistor 12 is connected to the ground line 26 through a line 45 and the other base is connected to the positive line 24 through a load resistor 46.

The emitter of the unijunction transistor 12 is biased to a desired level by being connected to a potentiometer 48 through a resistor 50 and the aforesaid time lag circuit formed by parallel elements 42 and 44. The potentiometer 48 is connected across the positive and negative lines 24 and 26 and is used to set a DC level on the input of the unijunction transistor 12 (through the movable arm, resistor 50 and the parallel resistor 42, capacitor 44 circuit) which is just below the level required to fire it. The potentiometer 48 thus determines the magnitude of pulse from the bridge circuit 10 required to trip the unijunction transistor 12. When a positive pulse is imposed on the output lead 34 by the bridge circuit 10, it is transmitted to the emitter of the unijunction transistor 12 and a sufficient level of energy is provided by the resistor 42 in combination with the pair of capacitors 40 and 44 and the resistor 41 to render the transistor 12 conductive.

When the transistor 12 is conducting, the potential on a line 54 connected to one of the bases of the unijunction transistor 12 suddenly drops. The line 54 serves as an input, through a coupling capacitor 56, to the one-shot multivibrator 14. The drop in potential on the line 54 causes a pulse of current to be transmitted through the capacitor 56 to the one-shot multivibrator 14, which is of conventional construction and includes a pair of "back-to-back" transistors 58 and 60, one of which (58) is maintained normally conductive while the other (60) is maintained normally nonconductive by means of baising resistors 62-74, as is generally known.

The pulse of current derived from firing of the unijunction transistor 12 results in an abrupt rise in the potential at the collector of the transistor 58. This rise in potential is transmitted as a current pulse through a coupling capacitor 76 to the base of the second transistor 60. The positive pulse of current caused by inactivation of the transistor 58 renders the transistor 60 conductive almost immediately upon inactivation of the transistor 58. The voltage potential at the collector of the transistor 60 thereupon decreases sharply, thus imposing a second path of negative voltage to the base of the transistor 58 through a coupling capacitor 78. Transmission of current through the normally conductive transistor 58 is thus initially stopped by the negative pulse created when current flows through the unijunction transistor 12 and is maintained inactivated by the holding circuit through the coupling capacitor 78, the time constant of which is determined primarily by the values of this capacitor and the resistors 64 and 74.

In other words, the base of the transistor 58 becomes sufficiently positive for it to become conductive at a predetermined time interval after it has been rendered inoperative by the pulse of current originally caused by firing of the unijunction transistor 12. When this occurs, there is immediate transmission of current through the resistor 72 and a consequent drop in potential at the collector of the transistor 58. This voltage variation at the collector of the transistor 58 results in a single pulse output of positive current having a rectangular waveform each time the unijunction transistor 12 is fired. This positive pulse of current is transmitted to the power amplifying transistor 16 through a coupling capacitor 80 and a biasing resistor 82. Diode 84 is provided to protect the base-emitter of the transistor 16 from reverse bias due to the abrupt change in potential at transistor 58.

The power amplifying transistor 16 is not in conduction except for the time interval during which the rectangular pulses are impressed on its base. As can be seen from the above description, a single rectangular pulse will be produced by the one-shot multivibrator 14 each time the value of the output from the bridge circuit 10 exceeds the bias voltage placed on the base of the unijunction transistor 12 by the potentiometer 48. When it is desired to store the number of times that the output of the bridge circuit 10 exceeds that value, the output of the power amplifier transistor 16 is connected to the magnetic storage core 18 by means of a double pole switch 86.

While the properties of saturable magnetic core devices as such are generally well known, a brief description here will be helpful to the reader in selecting or designing saturable core devices to meet particular needs. The magnetic storage device 18, as designed for saturation within the normal operating current range, is suitably a continuous toroid of spiral wound thin tape of the core material. The core material is characterized by its generally rectangular hysteresis loop and its high retentivity. A given volt-seconds excitation product per turn of winding is normally required to drive the core from its negative residual flux to its positive saturation level or from positive residual flux to the negative saturation level. It is known that when a series of pulses each of a magnetomotive force (M.M.F.) greater than the coercive force of a magnetic core but of an insufficient time duration to completely switch the core are applied to a magnetic core which exhibits a rectangular hysteresis loop, and which is at a boundary retentivity point of said hysteresis loop, the magnetic induction increases in steps through a plurality of intermediate remanence points until the other boundary retentivity point is reached. Retention of the core flux in the intervals between applied pulses before the volt-seconds product is sufficient to saturate in the opposite direction permits step-by-step integration of the volt-seconds product. Many core materials are presently used for such purpose, among them being nickel-iron or nickel-iron-molybdenum alloys.

In operation, thus, the magnetic storage device 18 is initially set in a state of predetermined saturation in one direction or another so that when the first pulse from the transistor 16 is placed into the core, a predetermined increment of volt-seconds is stored therein. Each subsequent pulse, as evidenced by an actuation of the unijunction transistor 12, results in a subsequent introduction of a given increment of volt-seconds into the core of the magnetic storage device 18. Thus, the magnetic energy level of the device 18 indicates accurately the number of times which the bridge circuit 10 has attained values above the threshold level of the unijunction transistor 12 set by the potentiometer 48.

When a sufficient number of pulses have accumulated in the storage device 18, the core becomes saturated in the opposite direction and offers low impedance to flow of current therethrough. When this occurs, a negative pulse across a resistor 88 is used to trigger a silicon controlled rectifier (SCR) 90 which energizes an indicator light 92. The indicator light 92 can thus be utilized to determine when a predetermined number of events have occurred at the bridge circuit 10. The light 92 will remain lit until a push button switch 93 is opened, thereby resetting the SCR 90.

The resistor 88, the SCR 90, and the indicator light 92 form part of the count-out circuit 20 which may also be utilized to determine the number of pulses imposed on the magnetic storage device 18 when this number has not yet reached the saturation point of the core. The count-out circuit 20 is connected to the positive terminal of the DC power supply 22 through a load resistor 95 by means of an input line 94. The count-out circuit 20 includes a coupling capacitor 98 and a diode 100, which along with the resistor 88, act to bias the SCR 90 to a desired level.

In counting out the number of pulses stored in the device 18, the direction of the switch 86 is first reversed. Then, a switch 102 is closed to produce a positive signal at the junction of the coupling capacitor 40 and the resistor 41, as a resistor 106 is short circuited. The positive signal is imposed through a line 108 which is connected to the positive terminal of the DC power supply 22. The signal actuates the unijunction transistor 12 through the capacitor 40 and the time lag circuit (42,44) in the same fashion as a threshold signal from the bridge circuit 10. This signal thus creates a positive rectangular wave output at the collector of the transistor 58 which is coupled through the capacitor 80 and the resistor 82 to actuate the power amplifying transistor 16 and induce into the coil of the device 18 an input which is of the same magnitude but which is reversed as to its polarity due to the fact that the terminals of the switch 86 have been transposed. The switch 102 is repetitively closed until the storage device 18 is once again saturated (returned to its initial starting point) whereupon there is a sharp conduction of current therethrough which provides a positive signal input to the SCR 90 which causes the indicating lamp 92 to light. The number of closures of the switch 102 may be counted until the light 92 is activated, thereby accurately reflecting the number of pulses which had originally been sensed by the storage device 18. At this point, the pushbutton switch 93 should be opened momentarily to deenergize the indicating light 92, and the switch 86 should be returned to its initial position. The magnetic storage device 18 will then once again be ready to store arriving pulses from the bridge circuit 10.

From the above description it should be apparent that readout and memory erasure of the device 18 take place simultaneously each time the switch 102 is closed. It should also be apparent that an accurate count-out is assured because the same circuitry produces the discrete energy pulses to the device 18 in the count-in and count-out modes. This eliminates part-to-part variations in the electrical components utilized to generate the count-out and count-in pulses. As previously noted, the use of a single winding and single core eliminates the exact turn ratio requirements of some prior art devices. Temperature compensation for this device is also simple and convenient since the storage core and pulse generator are identical for count-in and count-out and are in close proximity to each other.

In certain applications, of course, the count-out circuit 20 could become a separate entity. This is true because the count-out circuit is not critical to the input or count-in circuit. Such a device could be useful where it is desired to mount the storage element and bridge circuit in a small area for experimental purposes. After experimentation has ceased, the count-out circuit 20 could be connected to the pulse storage device and the pulses counted out as described above.

From the above description, it will be apparent that Applicant has provided a new and improved pulse storage and count-out device which utilizes a single core and winding for storage purposes and which utilizes the same circuitry to produce discrete energy pulses for counting in as well as counting out on the memory device. While a preferred embodiment of the invention has thus been shown and described, it will be obvious to those skilled in the art that there are certain changes and modifications which may be made in the above embodiment without departing from the invention in its broader aspect.

I claim:

1. A counting circuit comprising:
   means for generating a signal upon the occurrence of some event;
   a voltage level detector connected to said signal generating means;
   a one-shot multivibrator having an input connected to the output of said voltage level detector;
   power amplification means connected to the output of said multivibrator;
   storage means having an input connected to the output of said power amplification means, said storage means including a saturable magnetic core having a substantially rectangular hysteresis characteristic; and
   said signal generating means causing a pulse to be emitted to said voltage level detector, whereby said voltage level detector generates a pulse to said multivibrator which generates a uniform rectangular pulse to said power amplification means, said power amplification means transmitting the uniform pulse to the magnetic storage core such that the remanent flux of said storage core moves in discrete amounts.

2. The counting circuit recited in claim 1 wherein said voltage level detector comprises a unijunction transistor.

3. The counting circuit recited in claim 2 which further includes a potentiometer and means for connecting said potentiometer to said unijunction transistor such that the potentiometer sets a DC level on the input of said unijunction transistor just below the level required to fire said unijunction transistor.

4. The counting circuit recited in claim 1 wherein said storage means comprises a single magnetic core having single winding associated therewith.

5. The counting circuit recited in claim 1 wherein said magnetic storage core is initially saturated in one direction such that the pulses imposed thereon by said power amplification means move said storage core in equal steps toward saturation in the opposite direction.

6. The counting circuit recited in claim 5 which further includes means for determining when said storage core has reached its opposite direction of saturation.

7. The counting circuit recited in claim 6 wherein said saturation level determining means comprise a network including a resistor, a silicon controlled rectifier, and an indicating light connected in series with said silicon controlled rectifier, said network being connected to said counting circuit such that when said storage core becomes saturated in the opposite direction and offers low impedance to flow of current therethrough, a negative pulse will be imposed across said resistor to trigger said silicon controlled rectifier to energize said indicating light.

8. The counting circuit recited in claim 1 which further includes a count-out circuit for determining the number of pulses carried by said storage core.

9. The counting circuit recited in claim 8 wherein said count-out circuit comprises resistance means, a silicon controlled rectifier connected in series with said resistance means, an indicating lamp connected to the base of said silicon controlled rectifier, and a pushbutton switch connected in series with said indicating lamp and the input of said voltage level detector, whereby closing of said pushbutton switch actuates said voltage level detector in the same fashion as a threshold signal from the signal generating means, thus creating an input to said storage core which is of the same magnitude and from the same source as that generated by a threshold signal.

10. The counting circuit recited in claim 9 which further includes means for reversing the polarity of the input to said storage core.